(12) United States Patent
Srinivasan

(10) Patent No.: US 12,319,147 B2
(45) Date of Patent: ***Jun. 3, 2025

(54) PULSED ELECTRIC MACHINE CONTROL

(71) Applicant: Tula eTechnology, Inc., San Jose, CA (US)

(72) Inventor: Vijay Srinivasan, Farmington Hills, MI (US)

(73) Assignee: Tula eTechnology, Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 18/181,076

(22) Filed: Mar. 9, 2023

(65) Prior Publication Data

US 2023/0211672 A1 Jul. 6, 2023

Related U.S. Application Data

(63) Continuation-in-part of application No. 17/158,230, filed on Jan. 26, 2021, now Pat. No. 11,628,730.

(51) Int. Cl.
*B60L 15/20* (2006.01)
*B60K 17/356* (2006.01)
*H02P 23/14* (2006.01)

(52) U.S. Cl.
CPC ............ *B60L 15/20* (2013.01); *B60K 17/356* (2013.01); *H02P 23/14* (2013.01); *B60L 2240/26* (2013.01); *B60L 2240/423* (2013.01); *B60L 2240/486* (2013.01); *B60L 2240/647* (2013.01); *B60L 2240/662* (2013.01); *B60L 2260/20* (2013.01)

(58) Field of Classification Search
CPC ...... B60L 15/20; B60L 15/08; B60L 15/2054; B60L 2240/26; B60L 2240/423; B60L 2240/48; B60L 2240/486; B60L 2240/647; B60L 2240/421; B60L 2260/28; B60L 2260/20; B60L 2250/12; B60L 2270/142; B60L 2270/145; B60L 2270/14; H02P 27/08; H02P 27/085; H02P 23/28; H02P 23/0018; H02P 23/0031; Y02T 10/64; Y02T 10/72; Y02T 10/84

See application file for complete search history.

(56) References Cited

U.S. PATENT DOCUMENTS 4,441,043 A 4/1984 Decesare
4,989,146 A 1/1991 Imajo
(Continued)

FOREIGN PATENT DOCUMENTS

CN 1829070 A 9/2006
CN 102381265 A 3/2012
(Continued)

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.
(Continued)

*Primary Examiner* — Michael J Zanelli
(74) *Attorney, Agent, or Firm* — Beyer Law Group LLP

(57) ABSTRACT

Pulsed control of electric motors, and more particularly, to selectively adjusting one or more of a pulsing frequency, an amplitude of the pulses and/or a duty cycle of the pulses for reducing Noise, Vibration and Harshness (NVH) while maintaining high levels of operating efficiency.

16 Claims, 8 Drawing Sheets

(56) References Cited

U.S. PATENT DOCUMENTS

| | | |
|---|---|---|
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |
| 5,640,073 A | 6/1997 | Ikeda et al. |
| 5,731,669 A | 3/1998 | Shimizu et al. |
| 6,291,960 B1 | 9/2001 | Crombez |
| 6,308,123 B1 | 10/2001 | Ikegaya et al. |
| 6,370,049 B1 | 4/2002 | Heikkila |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,928,686 B2 | 4/2011 | Saha et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,007,005 B2 | 4/2015 | Sung et al. |
| 9,007,013 B2 | 4/2015 | Bae et al. |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,427,177 B2 | 8/2022 | Serrano et al. |
| 11,623,529 B2 | 4/2023 | Carvell et al. |
| 11,626,827 B2 | 4/2023 | Tripathi |
| 11,628,730 B2 | 4/2023 | Srinivasan |
| 11,695,361 B2 | 7/2023 | Carvell et al. |
| 11,863,096 B2 | 1/2024 | Carvell |
| 11,973,447 B2 | 4/2024 | Chen |
| 12,003,202 B2 | 6/2024 | Tripathi |
| 12,206,346 B2 | 1/2025 | Carvell et al. |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2007/0290650 A1 | 12/2007 | Muta |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0093151 A1 | 4/2011 | Kojima et al. |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0023648 A1 | 1/2016 | Yamamoto |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0205778 A1 | 7/2017 | Barrass et al. |
| 2017/0331402 A1 | 11/2017 | Smith et al. |
| 2018/0032047 A1 | 2/2018 | Nishizono et al. |
| 2018/0043791 A1 | 2/2018 | Suzuki et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0267919 A1 | 8/2019 | Suzuki et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |
| 2022/0234451 A1 | 7/2022 | Srinivasan |

(56) References Cited

U.S. PATENT DOCUMENTS

| | | |
|---|---|---|
| 2023/0114289 A1 | 4/2023 | Islam et al. |
| 2023/0219426 A1 | 7/2023 | Carvell et al. |
| 2023/0223885 A1 | 7/2023 | Tripathi |
| 2023/0253911 A1 | 8/2023 | Islam |
| 2023/0308040 A1 | 9/2023 | Farah et al. |
| 2024/0022191 A1 | 1/2024 | Phillips et al. |
| 2024/0022199 A1 | 1/2024 | Phillips et al. |
| 2024/0022200 A1 | 1/2024 | Phillips et al. |
| 2024/0063735 A1 | 2/2024 | Islam et al. |
| 2024/0063744 A1 | 2/2024 | Islam et al. |
| 2024/0063745 A1 | 2/2024 | Parsels et al. |
| 2024/0088806 A1 | 3/2024 | Carvell et al. |
| 2024/0136968 A1 | 4/2024 | Mazda |
| 2024/0291410 A1 | 8/2024 | Carvell et al. |
| 2024/0291416 A1 | 8/2024 | Tripathi |
| 2024/0364250 A1 | 10/2024 | Carvell |
| 2024/0372489 A1 | 11/2024 | Srinivasan |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | H05153705 | 6/1993 |
| JP | 10243680 | 9/1998 |
| JP | 2008-079686 A | 4/2008 |
| JP | 2009-065758 A | 3/2009 |
| JP | 2009-118544 | 5/2009 |
| JP | 2011-67043 | 3/2011 |
| JP | 2012-228134 | 11/2012 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2019-088132 | 6/2019 |
| JP | 2019-202603 | 11/2019 |
| JP | 2020048254 A | 3/2020 |
| KR | 10-2014-0038841 | 3/2014 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Spong et al., "Feedback Linearizing Control of Switched Reluctance Motors", IEEE Transactions on Automatic Control, vol. AC-32, No. 5, May 1987, pp. 371-379.

International Search Report and Written Opinion dated Apr. 18, 2022 from International Application No. PCT/US2021/063876.

Chen et al., Optimizing Electric Motor Controls with Dynamic Motor Drive; 30$^{th}$ Aachen Colloquium Sustainable Mobility 2021.

Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pp. DS3c. 10-1, XP032311951, DOI: 10.1109/EPEPEMC. 2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL. 2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Srinivasan, U.S. Appl. No. 18/985,561, filed Dec. 18, 2024.

PULSED ELECTRIC MACHINE CONTROL

CROSS-REFERENCE TO RELATED APPLICATIONS

This application is a continuation-in-part of U.S. application Ser. No. 17/158,230, filed on Jan. 26, 2021, which is incorporated by reference herein in its entirety.

BACKGROUND

The present application relates generally to pulsed control of electric motors, and more particularly, to selectively adjusting one or more of a pulsing frequency, an amplitude of the pulses and/or a duty cycle of the pulses for reducing Noise, Vibration and Harshness (NVH) while maintaining high levels of operating efficiency.

Electric motors and generators are structurally very similar. Both include a stator having a number of poles and a rotor. Most electrical motors can operate as a generator and vice-versa. When operating as motor, electrical energy is converted into mechanical energy. When operating as a generator, mechanical energy is converted into electrical energy. The term "machine" as used herein is therefore intended to be broadly construed to mean both electric motors and generators.

Electric machines are used in a wide variety of applications and are typically required to operate under a wide variety of loads. Since the energy conversion efficiency can vary considerably based on their measurable load, sometimes electric machines will operate at their peak efficiency, but very often they are required to operate outside their peak efficiency levels.

The pulsing is a known approach for improving machine efficiency. With a motor for example, an output torque is generated when pulsed on, but no torque output is generated between pulses. As a general rule, the amplitude (i.e., torque output) of the pulses is selected to be at or near the highest efficiency range of the motor while the duty cycle (i.e., the percentage of time the motor is pulsed on versus pulsed off) and/or frequency (i.e., the time interval between the pulses) are selected so that the overall output of the motor meets the requested torque demand, while operating as efficiently and economically as possible.

While the pulsed operation of machines increases efficiency and economy, there can be some downsides. In particular, the higher the amplitude of the pulses, the more Noise, Vibration and Harshness (NVH) that is typically generated. Also, if the frequency of the pulses is too low, excessive NVH may also result. In many applications, such as the use of motors in electric and/or hybrid vehicles, excessive NVH is unacceptable.

A need therefore exists to selectively adjust one or more of frequency, amplitude and/or duty cycle of the pulses used for pulsed operation of an electric machine for the purpose of reducing NVH, while still maintaining high levels of operating efficiency and economy.

SUMMARY

The present invention relates to a system and method for adjusting a pulsing frequency during pulsed operation of an electric machine on vehicle for reducing Noise, Vibration and Harshness (NVH) while maintaining high levels of operating efficiency.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present disclosure relates generally to pulsed control of electric machines (e.g., electric motors and generators) to improve the energy conversion efficiency of the electric machine when operating conditions warrant. More specifically, under selected operating conditions, an electric machine is intermittently pulsed to operate at higher efficiency levels compared to conventional continuous machine control, thereby delivering a desired average torque output in a more energy efficient manner than previously possible.

The Applicant has filed a number of applications related to the pulse control of electric machines, including U.S. Provisional Patent Application No. 62/644,912, filed on Mar. 19 2018, U.S. Provisional Patent Application No. 62/810,861, filed on Feb. 26, 2019, U.S. Provisional Application No. 62/819,097, filed Mar. 15, 2019 and U.S. Provisional Patent Application No. 62/658,739, filed Apr. 17, 2018. Each of the above-listed applications is incorporated by reference herein for all purposes.

For the sake of simplicity, the discussion below pertains to controlling the pulsing to reduce NVH in the context of motors used for electric vehicles and/or hybrid vehicles. It should be understood that discussion below should in no regard be construed as limiting. On the contrary, the same or similar pulsing strategies, as described herein, are equally applicable to machines while operating as generators and machines operating in a wide variety of applications, such as appliances like washing machines, dryers and dishwashers, HVAC equipment such as compressors, etc.

Efficiency Maps

Figure 1:
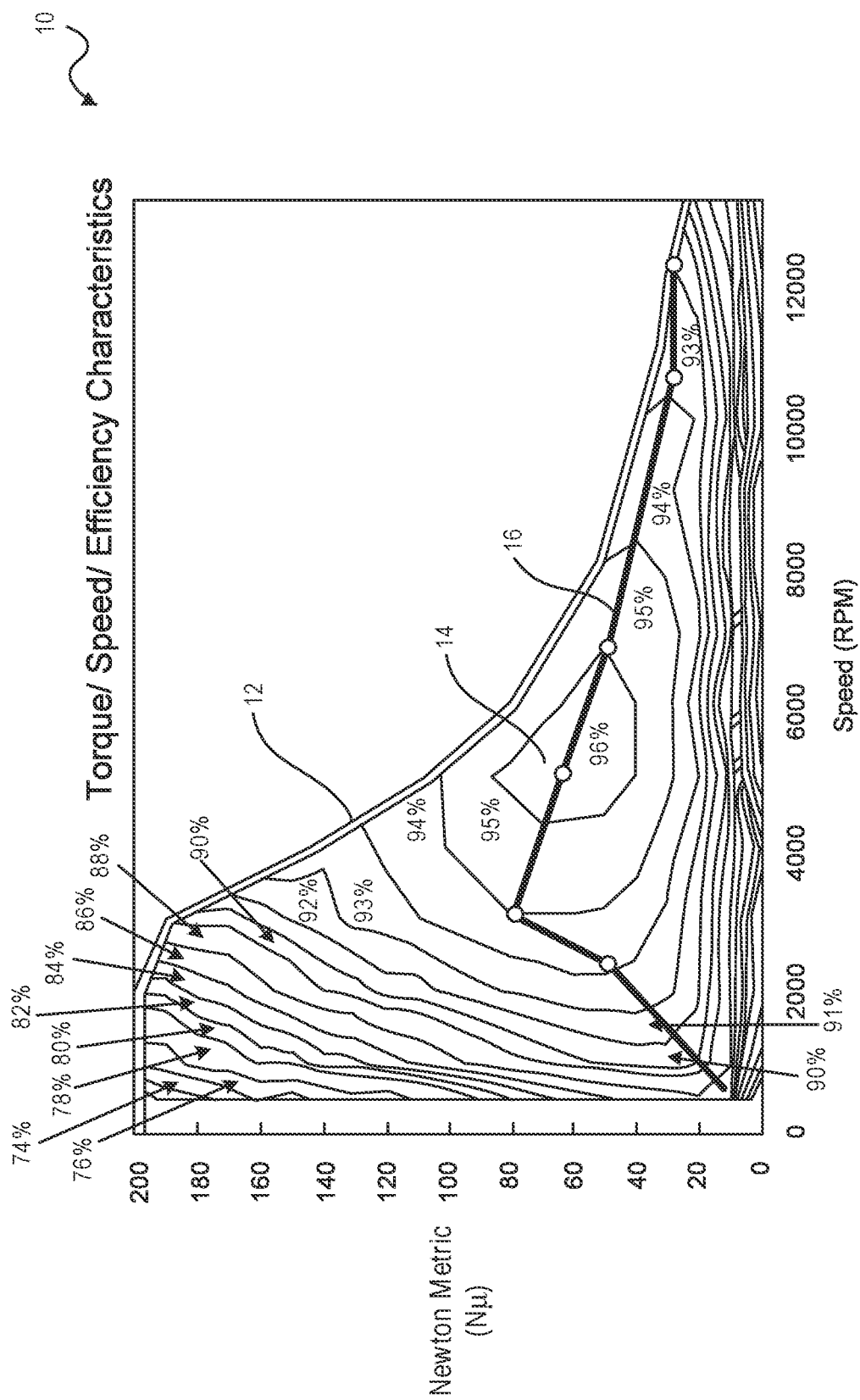
FIG. 1 is a representative Torque/Speed/Efficiency graph illustrating the energy conversion efficiency of a representative electric machine operating as a motor under different operating conditions.

Referring to FIG. 1, a motor efficiency map 10 that illustrates the nature of the above-defined problem is shown. In particular, the map 10 diagrammatically shows the efficiency of a representative motor under a wide range of different machine speeds (the X-axis) and torque values (the Y-axis). A number of operating characteristics of the motor are evident from the map 10. These characteristics include:

(a) The illustrated motor is generally most efficient when it is operating within a particular speed range and generating torque within a defined range. For the particular motor shown, the most efficient region is the area designated by reference number 14, which is generally in the range of 4500-6000 RPM with a torque output in the range of about 50-80 Nm. In this region 14, the energy conversion efficiency of the motor is approximately 96%. The region 14 is thus sometimes referred to herein as the "sweet spot", which is the most efficient operating region for a given machine.

(b) At any particular machine speed, there will be a corresponding most efficient output torque, which is diagrammatically illustrated by a maximum efficiency curve 16. The motor's efficiency, for any given machine speed, tends to drop off somewhat when the load is higher or lower than the most efficient load. In some regions the motor's efficiency tends to drop relatively quickly, as for example, when the torque output falls below about 30 Nm in the illustrated exemplary motor.

(c) Also, when the desired motor torque is below the most efficient output torque as designated by the curve 16 for a given current machine speed; the overall efficiency of the motor can be improved by pulsed operation. Conversely, when the desired motor torque is at or above the maximum efficiency curve 16, the motor may be operated in a conventional (i.e., continuous/non-pulsed) manner to most efficiently deliver the desired torque.

Based on the above-defined observations, it is clear that the overall energy conversion efficiency of the motor could be significantly improved if the operating conditions are controlled so that the motor is almost always operated at or near its "sweet spot" designated by region 14. Unfortunately, many applications require that the motor operate over a wide range of varying torque requirements, and/or widely varying machine speeds, often which fall outside of the sweet spot.

One such application is automotive and other vehicle or mobility applications where the electric motor is often coupled to the wheel of the vehicle or other driveline component(s) (such as the gearbox, transmission, any internal combustion engine, driveshaft, differential, etc.). Over a typical drive cycle the machine speed may vary between zero when the vehicle is stopped to a relatively high RPM when cruising at highway speeds. The torque requirements may also vary widely at any of those speeds based on components such as whether the vehicle is accelerating or decelerating, going uphill, downhill, going on relatively flat terrain, vehicle weight, and many other components. Of course, motors used in other applications may be subjected to a wide variety of operating conditions as well.

With pulsed control, the output of the machine is intelligently and intermittently modulated between "torque on" and "zero (no) torque" states in a manner that: (1) meet measurable torque demands, while (2) improving overall efficiency. Stated differently, under selected operating conditions, the electric machine is intermittently driven at a more efficient energy conversion operating level (the "torque on" state) to deliver a desired output. In the periods between the pulses, the machine ideally does not generate or consume any torque (the "zero torque" state). This can conceptually be thought of as turning the electric machine "off" In some implementations, this can be accomplished by effectively turning the electric machine "off," as for example, by shutting off drive current to a motor or the excitation current for a generator. However, in other implementations, the electric machine may be controlled during the "zero torque" state in a manner that attempts to cause the torque generated by the electric machine to be zero or as close to zero as practical or appropriate for the particular machine. In some implementations, any power converters used in conjunction with the electric machine may effectively be turned off for at least portions of the "zero torque" periods as well.

The efficiency map illustrated in FIG. 1, which happens to be for an internal permanent magnet synchronous motor used in a 2010 Toyota Prius, is merely illustrative. Similar efficiency maps can be generated for just about any electric machine although the operating characteristics of each map will vary from one machine to the next. The map of FIG. 1 should therefore not be construed as limiting in any regard.

Pulsed Motor Operation and Duty Cycles

Figure 2:
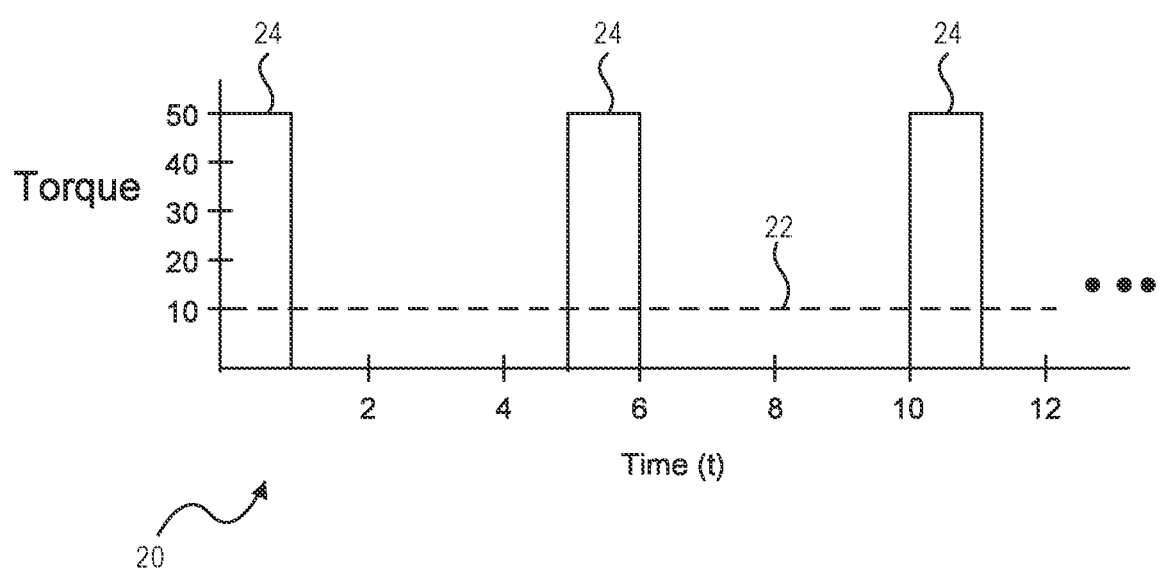
FIG. 2 is a graph illustrating a pulsed drive signal for an electric machine.

FIG. 2 is a plot 20 that illustrates an example of pulsed motor operation. In this particular example, the desired motor torque output is 10 Nm (as designated by the dashed line 22). The peak efficiency of this particular motor is at an output of 50 Nm of torque.

The plot 20 is useful in illustrating how the motor can be operated in different modes, each resulting in the generation of the desired motor torque of 10 Nm. However, as explained below, efficiency of the motor can be improved depending on which mode of operation is selected.

In a first mode, the motor can be run continuously, generating a steady output of 10 Nm. As noted above, since a steady output of 10 Nm is well below the most efficient output of the motor, this mode of operation is clearly less than ideal from an efficiency point of view.

In a second mode, the motor can be driven at its peak efficiency output of 50 Nm, but with a duty cycle of only 20% and delivering zero (no) torque the remaining 80% of the time. In other words, by pulsing the motor on using a twenty percent (20%) duty cycle at peak efficiency of 50 Nm, and off the remaining eighty percent (80%) of time between pulses, the same net output of 10 Nm is realized, but the overall efficiency of the motor is significantly improved.

FIG. 2 illustrates the second mode of operation. The on pulses 24 have amplitude of 50 Nm and a time period or frequency of 1 time unit out of every 5 time units (i.e., 20%). During the intervening 4 time periods (80%), the motor is controlled to produce zero torque. The net result is the average torque output is the desired 10 Nm, but with the motor operating almost exclusively in the peak efficiency range, overall efficiency is significantly improved.

The second mode of operation can be widely varied to meet changing measurable torque demands. For instance:
 (a) If the desired motor output changes to 20 Nm, the duty cycle of the motor operating at 50 Nm can be increased to 40%;
 (b) If the desired motor output changes to 40 Nm, the duty cycle can be increased to 80%;

(c) If the desired motor output changes to 5 Nm, the duty cycle can be reduced to 10% and so on.

As long as the desired motor output does not exceed the peak efficiency of 50 Nm, the desired motor output can be met merely by changing the duty cycle of the motor operating at 50 Nm. As each of these examples illustrate, pulsing the motor will advantageously yield efficiency benefits when the desired motor torque falls below the maximum efficiency curve 16.

The frequency or timing of the on and/or off time units actually used may vary widely based on the size, nature and design needs of any particular machine system. In practice, when the motor is switched from the "torque on" state to the "zero torque" state relatively rapidly to achieve a desired duty cycle, the fact that the motor is actually being switched back and forth between these states may not materially degrade the performance of the motor from an measurable standpoint. In some embodiments, the timing of the periods for each on/off cycle may widely vary. For example, in the above listed U.S. patent applications, the expected on/off cycle is described as being in the order of 100 μsec to 0.10 seconds (i.e. pulsing at a frequency in the range of 10 to 10,000 Hz), as for example in the range of 20 to 1000 Hz, or 20 to 100 Hz. The appropriate pulsing frequency may be a function of the type of electric motor being controlled and the application's tolerance for NVH that may be introduced by pulsing.

The zero torque portions of the pulse cycle might conceptually be viewed as shutting the motor off, although in many cases the motor may not actually be shut off during those periods or may be shut off for only portions of the "zero torque" intervals.

Pulsing of Alternating Current (AC) Motors

Many electric motors used for general passenger vehicles are designed to operate using alternating current (AC). However, this is by no means a requirement. With other vehicles, the motors used can be permanent magnet AC, induction AC and/or DC.

Figure 3A:
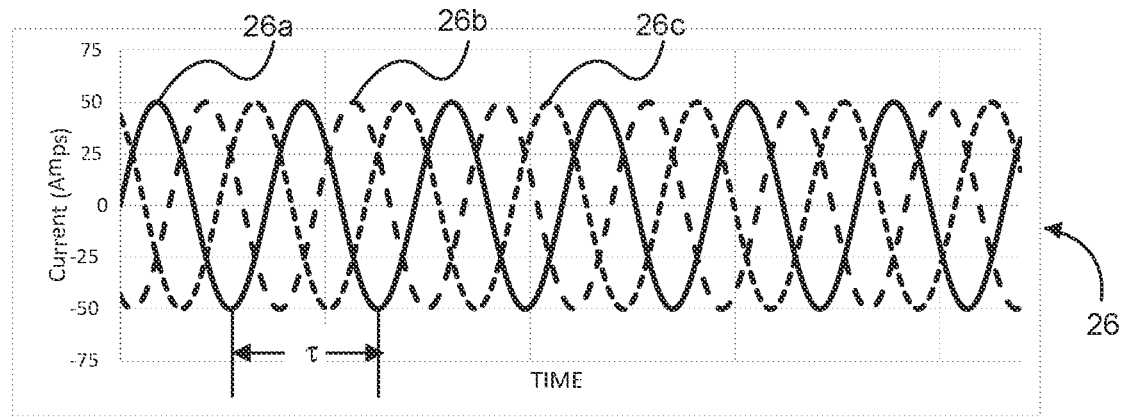
FIG. 3A is a diagrammatic representation of a continuous three-phase AC drive signal waveform.
Figure 3B:
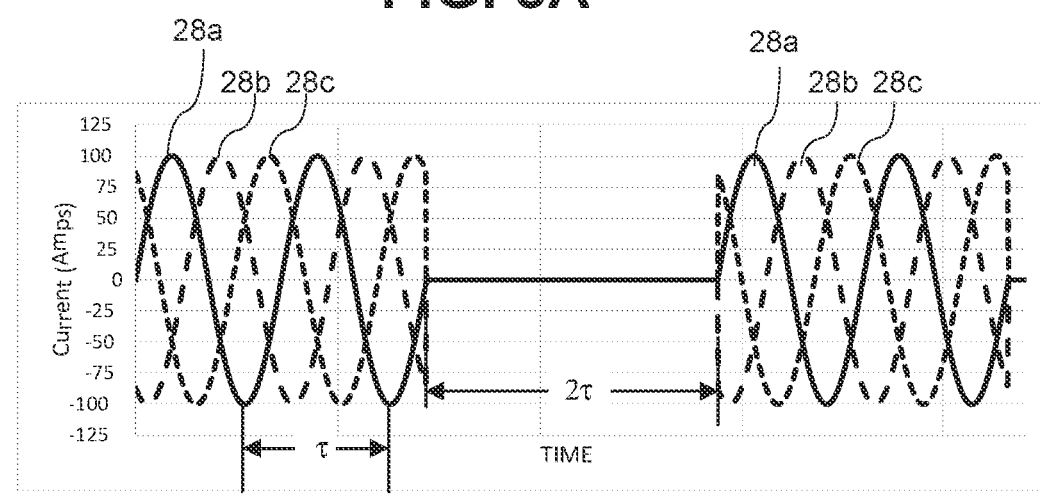
FIGS. 3B and 3C are two different examples of pulsed three-phase AC waveforms generating the same torque output as the continuous waveform of FIG. 2A, both having a 50% duty cycle, but different frequencies.
Figure 3C:
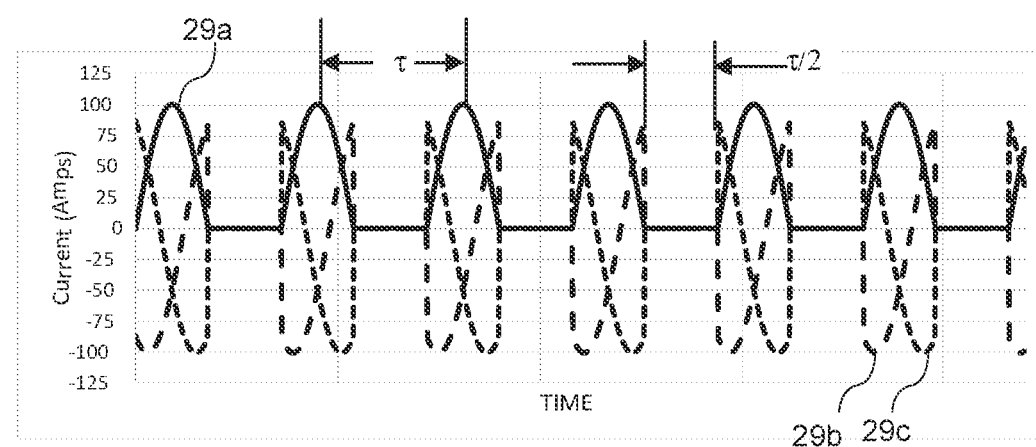

FIGS. 3A-3C are plots illustrating the difference between continuous and pulsed alternating currents that may be input to an electric machine operating as a motor, as for example, a three-phase induction motor. In each plot, current is plotted on the vertical axis and time is plotted along the horizontal axis.

FIG. 3A illustrates conventional sinusoidal three-phased input current 26a, 26b, and 26c delivered to the electric machine. Phase B, denoted by 26b, leads phase A, denoted by 26a by 120 degrees. Phase C, denoted by 26c, leads phase B by 120 degrees. The sine wave period is τ. The three-phased input power 26 is continuous (not pulsed) and has a designated maximum amplitude of approximately 50 amps. It should be appreciated that 50 amps is only a representative value and the current may have any value.

FIGS. 3B and 3C illustrate two examples of different pulsed three-phased currents 28a-c and 29a-c respectively, each having a fifty percent (50%) duty cycle and peak amplitude of approximately 100 amps. As in FIG. 3A the period of the base sine wave is τ, however, now the sine wave is modulated on and off. Assuming the machine speed is the same and the generated torque is substantially proportional to current, as is often the case, the delivered current in FIGS. 3B and 3C produces the same average torque as the continuously applied three-phased input current of FIG. 3.

The difference between pulsed currents 28a-c and 29a-c is the duration of their respective current pulses and the interleaved "off" periods.

In FIG. 3B, the current pulses 28a-c are interleaved with "off" periods and "on" periods of equal length, both of which are 2τ.

In FIG. 3C, the current pulses 29a-c and the interleaved "off" periods again have equal duration. In this case the duration is τ/2.

In both examples, the duty cycle is 50%. However, the duration of the "on" and "off" time durations is different (i.e. the frequency of the pulsed modulation is different). The frequency of the pulsed modulation may vary based on the type of electrical machine used, noise and vibration considerations, current operating rotor speed and other components.

FIGS. 3B-3C illustrates situations in which the "on" motor drive pulses are evenly spaced while the motor is operated at a steady state desired output level. Such an approach works well in many circumstances, but is not a requirement. The duty cycle need not be 50%, but can be adjusted to match the desired average output torque. Also, the phase of the on/off pulses need not be synchronized with the phase of the applied AC power. Thus, the relative sizes and/or timing of the motor drive pulses can be varied as long as they average out to deliver the desired torque.

Electric Machines and Vehicles

Electric and/or hybrid vehicles are now common and are increasing in popularity. It has been predicted that over the course of the next decade or two, electric and/or hybrid vehicles will surpass or altogether replace conventional internal combustion engine vehicles.

With electric and/or hybrid vehicles, one or more onboard traction machines is/are provided. In the case of an electric vehicle, only electric machine(s) is/are used to generate the needed torque to propel the vehicle. With a hybrid, the electric machine operates in cooperation with an internal combustion engine to propel the vehicle. With either type of vehicle, the torque generated by the electric machines may be a positive torque or a negative torque (i.e., the machine operates as a generator) to transfer vehicle kinetic energy into stored electrical energy. For example, with regenerative braking, the machine is typically used to convert mechanical energy into electrical energy that is stored in a storage device, such as a battery or capacitor. The stored energy can be used by the electric machine when operating as a motor, or alternatively to power other electrical systems on the vehicle, such as the air conditioner, heater, defroster, various lighting systems, entertainment system, etc.

The pulsing of an onboard machine when on a vehicle promises significant advantages for increased efficiency. By increasing efficiency, the range of the vehicle can be increased before either a battery recharge is needed and/or refueling is needed as is the case with hybrids. For example, if an electric vehicle with a range of 300 miles can increase its range by ten percent (10%) by operating the onboard machines more efficiently, then the range is extended by approximately another 30 miles.

Vehicles and NVH

In the automotive and truck industry, NVH is a major design consideration. If the NVH of a vehicle is too high, the experience for both the driver and other passenger occupants can become unpleasant. In addition, excessive NVH may cause premature wear and tear on the vehicle. The industry is therefore diligent in reducing NVH as much as reasonably possible. In addressing NVH related issues, three factors are generally considered, including:

(1) Sources of NVH. Generally, anything connected to the vehicle that vibrates, generates noise or harshness, such as the engine, motors, driveline components, wheels, open windows, exhaust systems, tire/road noise, gearboxes, differentials, etc., is considered a source of NVH;

(2) Engineering steps to reduce the transmission of the NVH to the driver or other occupants in the vehicle. For instance, engine or machine mounts, active vehicle suspensions, noise and damping materials, are examples of steps taken and/or materials used by automotive engineers to reduce the transmission of NVH; and (3) Features included on the vehicle to either (a) mask or reduce the amount of NVH perceived by the occupants or (b) to adjust the amounts of NVH that are considered acceptable. For instance, some vehicles now have active noise or vibration systems to cancel out noise and vibration within the cabin of the vehicle. Other vehicles may have active sound enhancement systems such as sports cars, which add noise within the cabin of the vehicle to make a more pleasing engine sound. Other vehicles may have driver selectable modes that will adjust the amount of NVH that is considered acceptable. If a vehicle is equipped with an economy mode or a sport mode, the amount of NVH that is considered acceptable when either of these modes is used is generally increased. In other words with the economy and sport modes, the driver is making a conscious decision to forgo lower levels of NVH for either improved economy or performance respectively. On the other hand the vehicle may also have a comfort mode, in which case active steps are taken to reduce the levels of NVH. In this latter mode, the driver is making a conscious decision to forgo economy for improved comfort.

Defining Pulse Parameters for Vehicle Applications

With the pulsing of electric machine for vehicle applications, the critical parameters of the pulses for meeting torque demands include (1) amplitude, (2) duty cycle, and (3) frequency. With vehicles powered by electric motors, the amplitude of the pulses is largely dictated by the optimal efficiency value of the motor for a given torque request and machine speed (i.e., the "sweet spot" as defined by maximum efficiency curve 16 of FIG. 1 for example). By pulsing the amplitude at or near the "sweet spot", the most efficient and economical operation can be achieved. With the amplitude of the pulses known, determining the duty cycle is relatively straight forward. The duty cycle is dictated by the ratio of the requested torque versus the optimal torque when the machine is operating at its optimal efficiency value. Accordingly, the first two parameters are readily determined.

Determining the third parameter, the frequency of the pulses, however, is more challenging since there are opposing factors to consider. With automotive applications, the pulsing of a machine at low frequencies causes mechanical vibrations. Since humans are most sensitive to low frequency mechanical vibrations in the 2-10 Hz frequency range, a pulsing frequency within this range may result in high or even unacceptable levels of NVH. Thus, for vehicles, the ideal pulsing frequency is typically at a higher frequency rate, but not too high a rate such that some or all efficiency gains resulting from pulsed operation are lost in switching transients. The objective then is to select, for a given torque request and speed, a minimum pulse frequency so as to preserve or maintain efficiency gains while meeting acceptable levels of NVH.

Vehicle Measurable Parameters and/or Features that Affect NVH

One aspect of the present application is to select a pulsing frequency for electric machines that are used on vehicles. Rather than picking a pulsing frequency simply based on avoiding the 2-10 Hz frequency range, the present application teaches that numerous other considerations may also be used to adjust or "fine tune" the pulsing frequency so as to (1) achieve high levels of economy while (2) providing a driving experience with acceptable levels of NVH. Such other considerations include a number of measurable parameters of components on the vehicle itself and/or features on the vehicle that may affect the level of NVH that is considered acceptable. Such exemplary components and/or features, and how they may affect NVH, are discussed below.

Gearing

Electrical vehicles having a multi-gear gearbox can generally be run more efficiently than those having just a single gear. With multiple gear ratios, the electric machines of the vehicle may operate more efficiently over a wider range of speeds and/or torques. With electric and/or hybrid vehicles with multi-gear gearboxes, however, each gear may result in different resonant frequencies for the vehicle and/or driveline. For example, in one gear, the resonant frequency may be 15 Hz, but 25 Hz in a second gear. As a result, the frequency for pulsing an electric machine should be selected so as to not exasperate the resonate frequency of the gear the vehicle is using. Accordingly the pulsing frequency is preferably selected so as to (a) avoid or exasperate resonate frequencies and (b) increase efficiency. As will be appreciated by those familiar with the art, electric vehicle gearing is more common in trucks (e.g. truck tractors) and other heavy vehicles, although gearing is also sometime used passenger vehicles, SUVs, light trucks and others. In some embodiments, a transmission type electric vehicle gearbox will have just two available gear ratios. In others, the gearbox may have three or more available gear ratios.

Wheel Drive Status

Many electric and/or hybrid vehicle include multiple electric machines, including one or potentially more machines per wheel. With multiple electric machines, the vehicle may operate in different wheel drive configurations at any point in time. For instance, depending on driving conditions or circumstances, a given vehicle can operation in Rear Wheel Drive (RWD) only, Front Wheel Drive (FWD) only, or All Wheel Drive (AWD). With most vehicles, the NVH characteristics differ depending on the wheel drive configuration since the individual electrical machines may be either connected or disconnected from the driveline. Also, the resonant frequencies of the vehicle may change depending on which electric machines are connected and active and which are disconnected and are not active. For each possible combination, the vehicle will therefore exhibit different NVH characteristics. Accordingly, depending on the current wheel drive status, the pulsing frequency is preferably adjusted for each possible wheel drive configuration. Again, the objective is generally to improve economy and efficiency, while not generating excessive levels of NVH.

From the foregoing, it should be apparent that when a vehicle has more than one electric machine that can deliver torque to a wheel, the NVH characteristics will typically differ based on which electric machine(s) is/are active or not active. For example, when two different electric machines are capable of delivering torque to a particular wheel, the NVH characteristics for when the first electric machine is active and the second electric machine is not active will be different than the NVH characteristics when the second electric machine is active and the first electric machine is not active, which is turn is still different than when both electric machines are active. As such, the pulsing frequency may be adjusted based on such variations in wheel drive status.

Although not yet common in electric vehicles, some vehicles have transfer cases that allow the vehicle to drive different wheels or wheels sets based on the transfer case setting (e.g., switching between 2- and 4-wheel drive status). It should also be apparent that the NVH characteristics will differ based on wheel drive status when transfer cases are used to change between wheel drive statuses. Again, the pulsing frequency may be adjusted based on such variations in wheel drive status. It should be appreciated that a transfer case is another type of gearing. Most typically, the transfer case will have an engaged state and a disengaged state. For example in some 4-wheel drive vehicles, when the transfer case is engaged, the transfer case will distribute power between front and rear axles to facilitate 4-wheel drive operation. In contrast, when the transfer case is disengaged, power is only applied to one of the axles thereby facilitating 2-wheel drive operation. Although transfer cases that facilitate changing between two and four wheel status are described, it should be appreciated that transfer cases can be used to facilitate other wheel drive configurations as well.

Vehicle Weight or Loading

As is well understood in the field of physics, force equals mass times acceleration ($F=M \times A$). As a general rule for a given excitation force, the larger the mass, the slower the mass will accelerate or vibrate. With vehicles, this law of physics generally means the more weight and/or load carried by a vehicle, the less NVH there will be. With a heavy load, such as multiple passengers or heavy cargo, the amount of NVH will tend to be less than if the vehicle had only a driver or was carrying no or a light cargo. As a general rule therefore, lower pulsing frequencies can be used for high mass vehicles and/or vehicles carrying a heavy payload compared to lighter vehicles or vehicles carrying light or no payload. The change in vehicle mass may also affect the natural frequencies of the vehicle. Hence, the motor pulsing frequency to be avoided may also change with vehicle mass. This may lead to a lower frequency being avoided for a higher vehicle mass.

Machine and/or ICE Mounts

On most electric vehicles, mounts are used to attach the machines to the driveline of the vehicle. With hybrids, mounts are also used between the internal combustion engine (ICE) and the frame and/or driveline of the vehicle. In either case, the mounts are used to mechanically isolate the electric machine or ICE and prevent vibrations from being transmitted to other portions of the vehicle including the passenger cab. While mounts generally work in reducing NVH, they do have some drawbacks. First, mounts typically work best when they are at a warm operating temperature. As such, mounts may be less effective in stopping the transmission of vibration when cold, such as with low ambient temperatures, or immediately following a cold start. Second, as mounts age, they tend to lose their effectiveness in damping the transmission of vibrations. Either way, more NVH is typically transmitted along the driveline and via other paths to the occupants of the vehicle. Accordingly the pulsing frequency for pulsing electric machines can be more aggressive when mounts are warm and/or newer, meaning a lower pulsing frequency can be used. On the other hand for aging mounts, cold starts and/or cold ambient temperatures, a higher pulsing frequency can be used so as to not generate excessive levels of NVH.

User Adjustable Features

Many vehicles now include features that allow the setting or adjustment of the level of NVH that is tolerable. Such features include, but are not limited to, an economy or "eco" mode, a sport mode, a luxury mode, or a selectable NVH level mode. With the eco mode, the driver can opt to improve efficiency at the expense of additional NVH. As a result, the pulsing frequency used while operating in the eco mode can be more aggressive (i.e., a lower pulsing frequency is used) relative to when the vehicle is in a non eco mode. Similarly with the sport mode, the driver has opted for more performance at the expense of increased NVH. With the higher level of acceptable NVH, a lower, more aggressive, pulsing frequency may be used. On the contrary if the driver selects a "luxury" mode or similar, then low levels of NVH are expected. A more benign pulsing frequency (i.e., a higher pulsing frequency) should therefore be used so that the electric machines generate less NVH. If the vehicle has an adjustable NVH control, then again the pulsing frequency can be adjusted depending on the NVH setting. If more or less NVH is selected by the driver as acceptable, then the pulsing frequency can be adjusted lower or higher respectively.

Occupancy and/or Autonomous Driving

Autonomous driving is in its early stages of development and deployment. In the near future, however, autonomous driving is expected to become commonplace. With autonomous driving, a vehicle can drive either unoccupied or with passenger(s). In cases where there are no passengers, NVH constraints can be relaxed since there is no human inside the vehicle. Accordingly, when an occupancy sensor in a vehicle senses no passengers, then a more aggressive (i.e., a lower) pulsing frequency can be used compared to when a driver and/or passengers are present.

Ambient Temperatures

Vehicles tend to run smoother, with less NVH, when operating at a warm temperature as opposed to a cold temperature. When the ambient temperatures are cold, and prior to the vehicle warming to its normal operating temperature, excessive NVH may be generated. For example, cold ambient temperatures adversely cause various vehicle components, such as body mounts, exhaust hangers, the suspension system, tires, etc., to generate more NVH. The pulsing frequency can therefore be adjusted upward or downward depending on if the ambient temperature is cold or hot respectively. As the vehicle warms, and/or as the ambient temperatures warm, then the pulsing frequency can be reduced accordingly.

Models

As previously noted, when the driveline and/or other components of a vehicle are cold, they tend to generated more NVH. As the vehicle warm and reaches its operating warm temperature, the level of NVH typically decreases. Similarly, a new vehicle typically generates less NVH than an old vehicle. Due to wear and tear, vehicle components such as engine mounts, shock absorbers, springs, etc., become less effective and tend to transmit more NVH. In non-exclusive embodiments, vehicles may include software programs or algorithms (hereafter generically referred to as "models") that predict NVH during operation. For example, one model can be employed to predict the level of NVH as a vehicle warms immediately following a cold start. Another model can be used to predict NVH has the vehicle ages. In either case, the models can be used to predict the level of NVH generated by the vehicle during operation. Then based on the predicted NVH, a pulsing frequency can be adjusted. Again, when higher levels of NVH are predicted, higher pulsing frequencies are typically used. When predicted NVH levels are low, then lower pulsing frequencies may be used.

Active Noise and/or Vibration Control

Many vehicles now include active noise and/or vibration control systems than can be used to cancel NVH. For instance, some automobiles now employ active noise cancellation technology through the audio system of the vehicle to cancel out noise that infiltrates into the cabin. Similarly, many vehicles also have adjustable suspension systems, such as magnetic ride control, that prevent vibrations from reaching the occupant(s) of the cabin of the vehicle. Since these systems mask out a certain amount of NVH, more aggressive (i.e., lower) pulsing frequencies may be used compared to if such systems are not used.

Road Surface Conditions

Many vehicles now include equipment that makes it possible to monitor road surface conditions. Such equipment includes, for example, onboard cameras, radar and/or lidar that are used for cruise control and other forms of autonomous driving, and GPS. In other embodiments, wheel speed sensors, or acceleration sensors mounted on one or more of the wheels, can be used to detect road surface conditions. In each case, the surface conditions of the road a vehicle is traveling can be monitored and ascertained. In situations where the road surface is poor (e.g., pot holes, surface cracks, worn paved surfaces, etc.) the vehicle will unavoidably experience high levels of NVH. In contrast with a smooth road surface, the levels of NVH will be much lower. Depending on the road surface, the pulsing frequency can therefore be adjusted depending on the road surface. When the road surface is rough, the pulsing frequency for electric machines can be more aggressive (i.e., a lower pulsing frequency) since the NVH from the road surface will mask out any NVH caused by the pulsing of the electronic machine(s). When the road surface is smooth, the pulsing frequency is preferably increased so that NVH from operation of the electric machine(s) do not cause noticeable or excessive NVH.

Tables

In the above discussion pertaining to (a) gearing, (b) wheel drive states, (c) vehicle mass and/or payload, (d) mounts, (e) user adjustable features (e.g., eco, sport, luxury modes and/or NVH adjustable levels, (f) temperature and/or occupancy sensors, (g) models, (h) active noise or vibration cancelling systems, and/or (i) road surface monitoring equipment, it is proposed to adjust or "fine tune" the pulsing frequency to take into account a wide variety of operating conditions and circumstances and any of the parameters or features (a) through (i) discussed above. By fine tuning the frequency either up or down, (1) higher levels of economy can be achieved, while (2) always providing "acceptable" levels of NVH, which may varying depending on conditions and circumstances. For each of (a) through (i), a number of different approaches can be used for ascertaining the pulsing frequency that meets the above-described objectives (1) and (2). Such approaches include, but are not limited to, the use of tables, sliding scales, a multiplier/divider, etc.

A proposed approach of selecting a pulsing frequency that allows for more or less NVH as conditions warrant, but without ever generating excessive levels of NVH, is the use of one or more table(s). With such an approach, one or more tables is/are constructed using empirical data for a given vehicle-electric machine or machines combination. From the data, the table(s) is/are constructed that define the ideal or preferred pulsing frequencies over a wide variety of operating conditions that permit for either more or less aggressive pulsing frequencies as circumstances warrant, meaning allowing more NVH or reducing NVH, without ever generating excessive levels of NVH.

Figure 4:
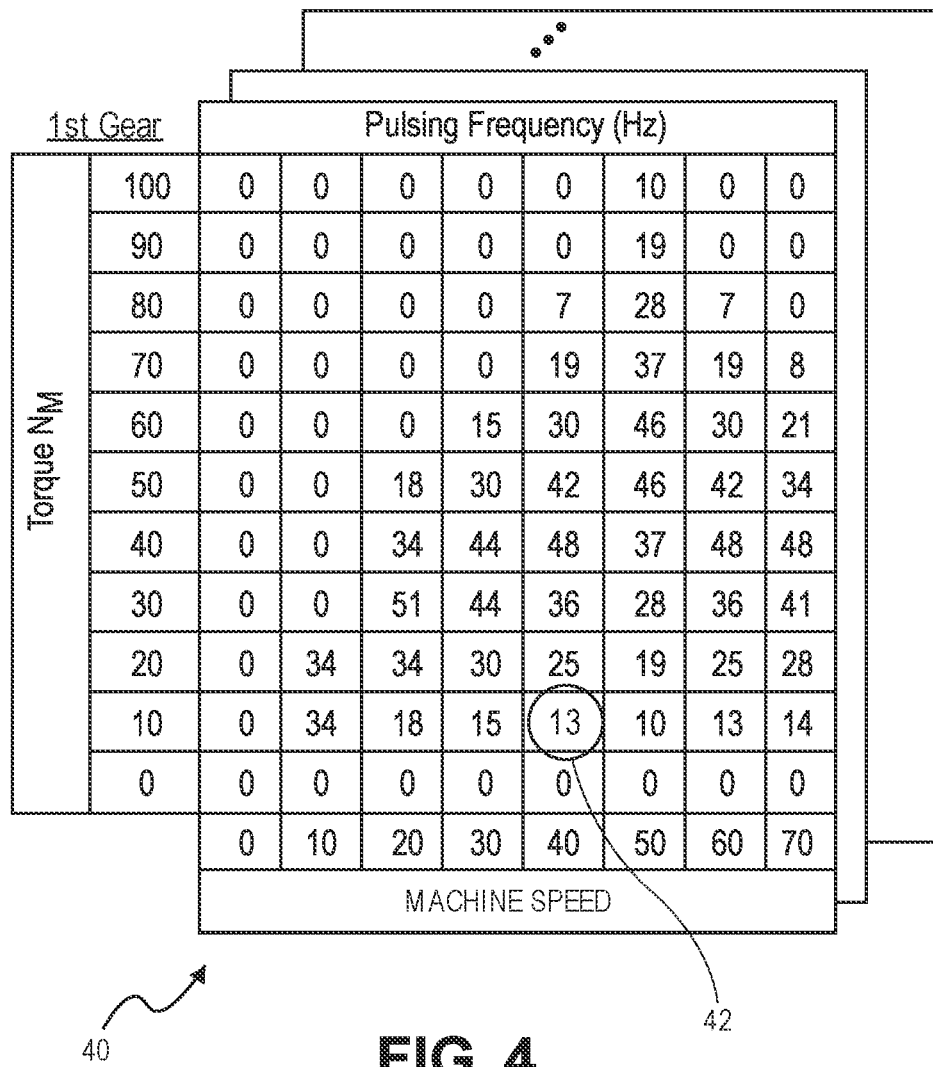
FIG. 4 illustrates a representative table that provides pulsing frequencies for different combinations of torque and/or machine speeds in accordance with a non-exclusive embodiment of the invention.

Referring to FIG. 4, an exemplary table 40 is provided. Table 40 lists the pulsing frequency for electric machines for a wide range of torque demands (Nm) and machine speeds for a vehicle operating in a first ($1^{st}$) gear of a gearbox. By way of example, the table 40 indicates a preferred pulsing frequency of 13 Hz, as signified by the circle 42, is suitable for the when the torque demand is 10 Nm, the speed is 40 rpms, and the gearbox is in first gear. While the vehicle is operating in first gear, the table 40 can be accessed as the torque demand changes and/or the speed changes. Thus, as driving conditions change, the table 40 can be indexed and a different pulsing frequency can be defined, depending on the current torque demand and speed. It is noted that the particular frequencies listed in the table are merely exemplary and should not be construed as limiting in any regard.

For the sake of simplicity, only one table 40 is described and illustrated. It should be understood that in real-world applications with most vehicles, typically multiple tables will be used. In certain non-exclusive embodiments, multiple tables are typically provided for each of (a) through (i) as defined above. For instance, tables are provided for (a) each gear in the gearbox, (b) for each possible configuration of the wheel drive, (c) for a wide range of payloads, and so on for (d) through (i) respectively. In each case, the various pulsing frequencies provided in the tables are created from empirical data collected during testing for a given vehicle-machine(s) combination. Once the testing of the vehicle is complete, and the empirical data collected and processed, the individual tables can be constructed. In each case, the pulsing frequencies are preferably selected that permit for either more or less aggressive pulsing frequencies, meaning more or less NVH, without ever generating excessive levels of NVH, while maximizing efficiency for a given set of conditions and/or circumstances.

It is further noted that the tables do not necessarily have to be two-dimensional as illustrated in FIG. 4, but rather may have more than two-dimensions. With gearing for example, a three dimensional table that is indexed by torque demand, machine speed and individual gears (i.e. $1^{st}$ gear, $2^{nd}$ gear, $3^{rd}$ gear, etc.) can be constructed as well, as opposed to having separate or distinct tables for each gear. Furthermore, the any of the remaining listed parameters and/or features (b) through (i) can rely two or more than two dimensional tables as well. In yet other embodiments, there does not necessarily have to be a dedicated set of one or more tables for each of the parameters and/or features (a) through (i). In other embodiments, the proposed pulsing frequencies for multiple parameters and/or features can be combined into a single table or a set of related tables. For example driver selectable features such different driving modes (e.g., eco, sport, luxury, etc.) can all be combined into one table.

Sliding Scales and Multipliers/Dividers

In other non-exclusive embodiments, a sliding scale and/or a multiplier/divider can be used ascertain the pulsing frequency for any of (a) through (i). For example with vehicle mass and/or payload (c), a sliding scale or multiplier can be used. In other words as the mass of the payload of a vehicle is increased or decreased, then the pulsing frequency is either scaled downward or upward respectively. Alternatively, a multiplier/divider value can be used to adjust a base pulsing frequency for any of (a) through (i). In variations of these embodiments, the scaling factor and/or the divider/multiplier can be either linear or non-linear. In the case of the latter, scaling and/or multiplier/divider algorithms can be used to ascertain the pulsing frequency in a non-linear fashion depending on conditions and circumstances.

Motor Controller Architecture

Figure 5A:
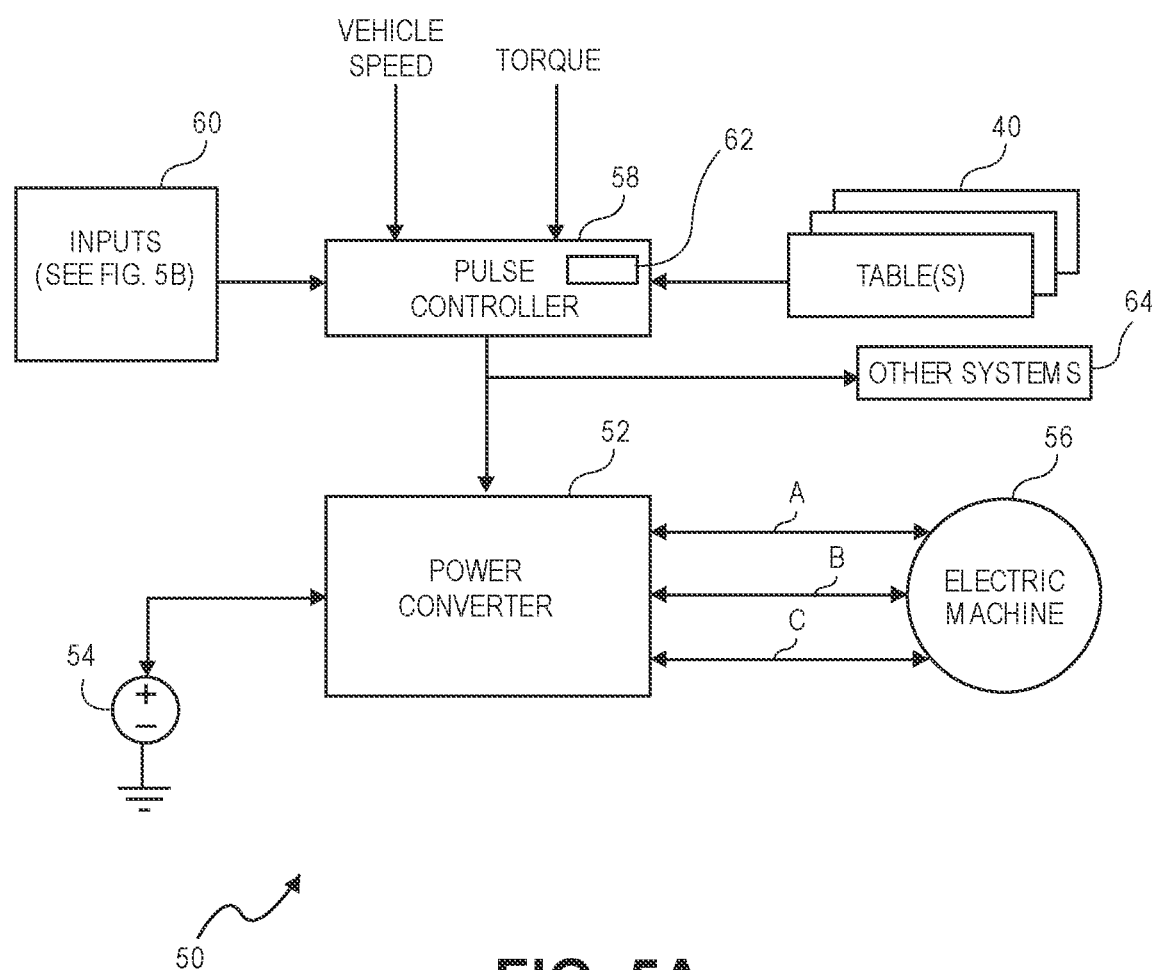
FIG. 5A is a functional block diagram illustrating a motor controller in accordance with a non-exclusive embodiment of the invention.

Referring to FIG. 5A, a block diagram of a power control architecture 50 is illustrated. The architecture 50 includes a power converter 52, a DC power supply 54, an electric machine 56, a pulse controller 58, one or more inputs 60, and one or more tables 40. In addition, the pulse controller 58 is arranged to receive torque demand and machine speed inputs. In an optional embodiment, the pulse controller 58 includes a computation module 62.

The power converter 52 operates as a power inverter or power rectifier depending on the direction of energy flow through the system. When the electric machine 56 is operated as a motor, the power converter 52 is responsible for generating three-phased AC power from the DC power supply 54 to drive the machine 56. The three-phased input power, labeled as phase "A", phase "B", and phase "C", is applied to the windings of the stator of the electric machine 56 as is well known in the art. When the electric machine 56 is operating as a generator, the power converter 52 operates as a power rectifier and the AC power coming from the electric machine 56 is converted to DC power that is stored in the DC power supply 54. In various embodiments, the power controller 52 may be a conventional power converter or a "boosted" power converter, both of which are described in detail in commonly assigned U.S. application Ser. No. 16/818,570 filed Mar. 13, 2020, incorporated by reference herein for all purposes.

The pulse controller 58 is also responsible for (1) defining when the machine 56 should operate in a continuous mode or pulsed mode, (2) defining the pulsing amplitude, pulsing frequency, and duty cycle for the three-phased input power signals A, B and C when in the pulsed mode and (3) providing control signals so that the power converter 52 can either continuously generate or pulse the three-phase power signals A, B and C provided to the machine 46. During pulsed operation, the three-phase power signals A, B and C are pulsed in accordance with whatever the amplitude, duty cycle and pulsing frequency the pulse controller determines to meet the torque demand for a given speed.

As previously described, determining the amplitude and the duty cycle for a given torque demand and speed are relatively straight forward. The amplitude is selected so that the electric machine 56 operates in or near its "sweet spot" maximum efficiency range, while the duty cycle is adjusted as needed so that the torque output of the electric machine meets the requested torque. Ascertaining the pulsing frequency, however, is more involved due to NVH implications.

Figure 5B:
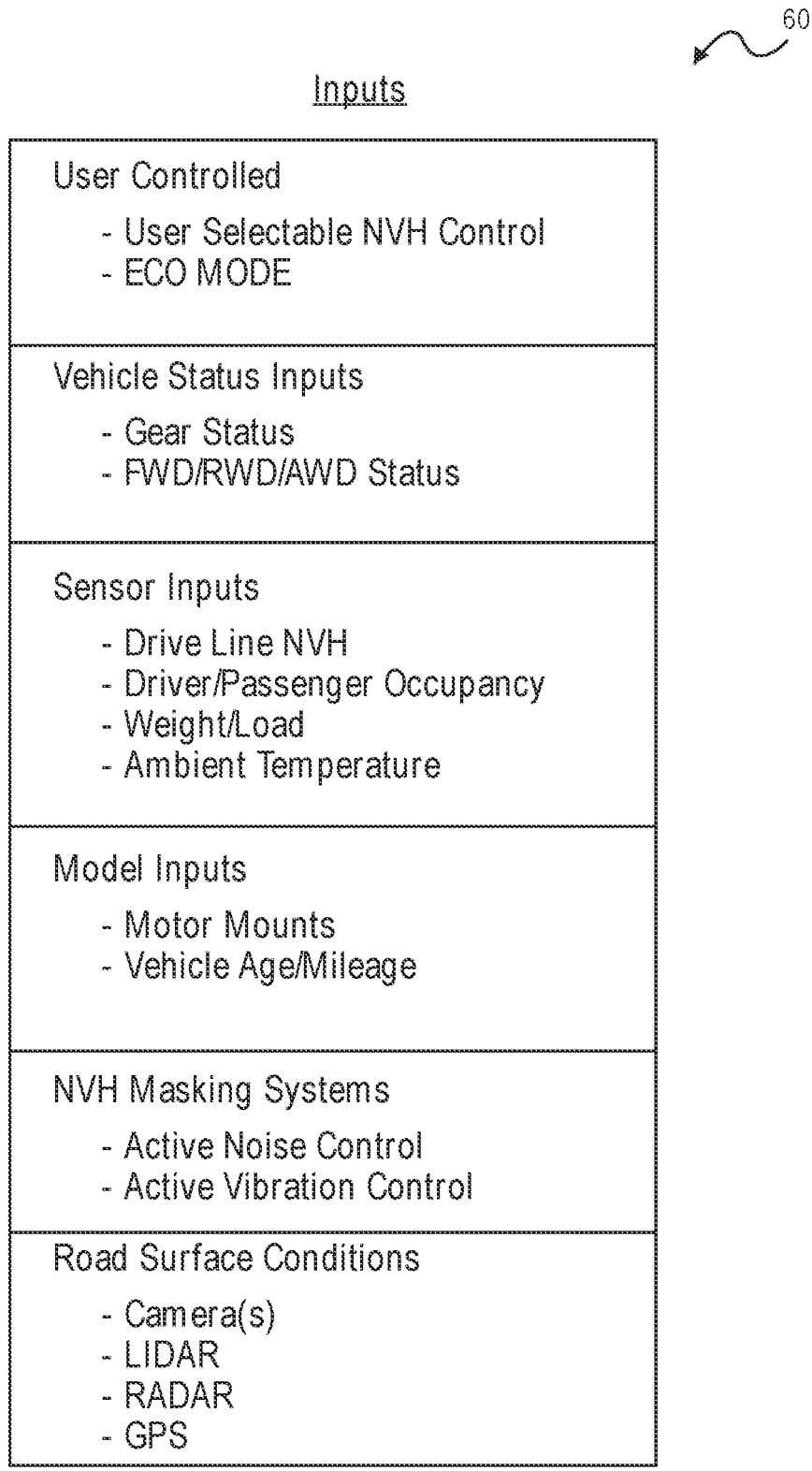
FIG. 5B is a non-exhaustive list of possible inputs that may be provided to the motor controller in accordance with a non-exclusive embodiment of the invention

To ascertain the pulsing frequency, the pulse controller 58 receives one or more of the inputs 60 (see FIG. 5B for a list of possible inputs, all of which have been previously described). In response, the pulse controller 58 accesses the one or more tables 40 for any or all of (a) through (i) as defined above and ascertains a pulsing frequency that maximizes efficiency without creating excessive NVH for a given set of inputs, operating conditions and circumstances. In this way, the machine 56 operates at or near it's the maximum efficiency level (e.g., see the curve 16 of FIG. 1), while allowing more or less NVH as conditions warrant, but without ever generating excessive levels of NVH. In an alternative embodiment, the computation module 62 can be used to scale, multiply, divide or apply an algorithm to ascertain the pulsing frequency as described above. In various embodiments, the computation module may include a look up table, a multi-dimensional look up table, a sliding scale, a multiplier, a processor, a logic unit, a trained neural network, or any combination thereof.

It should be noted that the inputs listed in FIG. 5 are merely exemplary and should not be construed in any regard as exhaustive. On the contrary, the number and type of inputs may widely vary and should not be limited to those explicitly mentioned herein.

During driving, various torque demands will be made and the machine speed will change depending on the gear and as the vehicle accelerates and/or decelerate, drives up hills or down hills, etc. The pulse controller 58, in response, adjust the amplitude and duty cycle of the pulses as needed and ascertains the different pulsing frequencies to meet the instantaneous torque demands while preventing excessive levels of NVH. When conditions warrant, a more aggressive pulsing frequency may be used to improve efficiency and economy. Alternatively, less aggressive pulsing may be used to prevent excessive NVH. As a result, the vehicle can overall be operated in a highly efficient manner, while selectively controlling NVH levels generated by the electric machine 56 so as to prevent or mitigate excessive levels of NVH.

Sharing the Pulsing Frequency

In yet another embodiment, the pulsing frequency as defined by the pulse controller 58 can also be forwarded on to other sub-systems 64 on the vehicle that could utilize this information in meaningful ways. One example is to provide the pulsing frequency to sub-system(s) 64 such active noise and/or vibration control, which could use the pulsing frequency information as a reference/feed-forward signal to identify which frequencies to target for cancellation.

Flow Diagram

Figure 6:
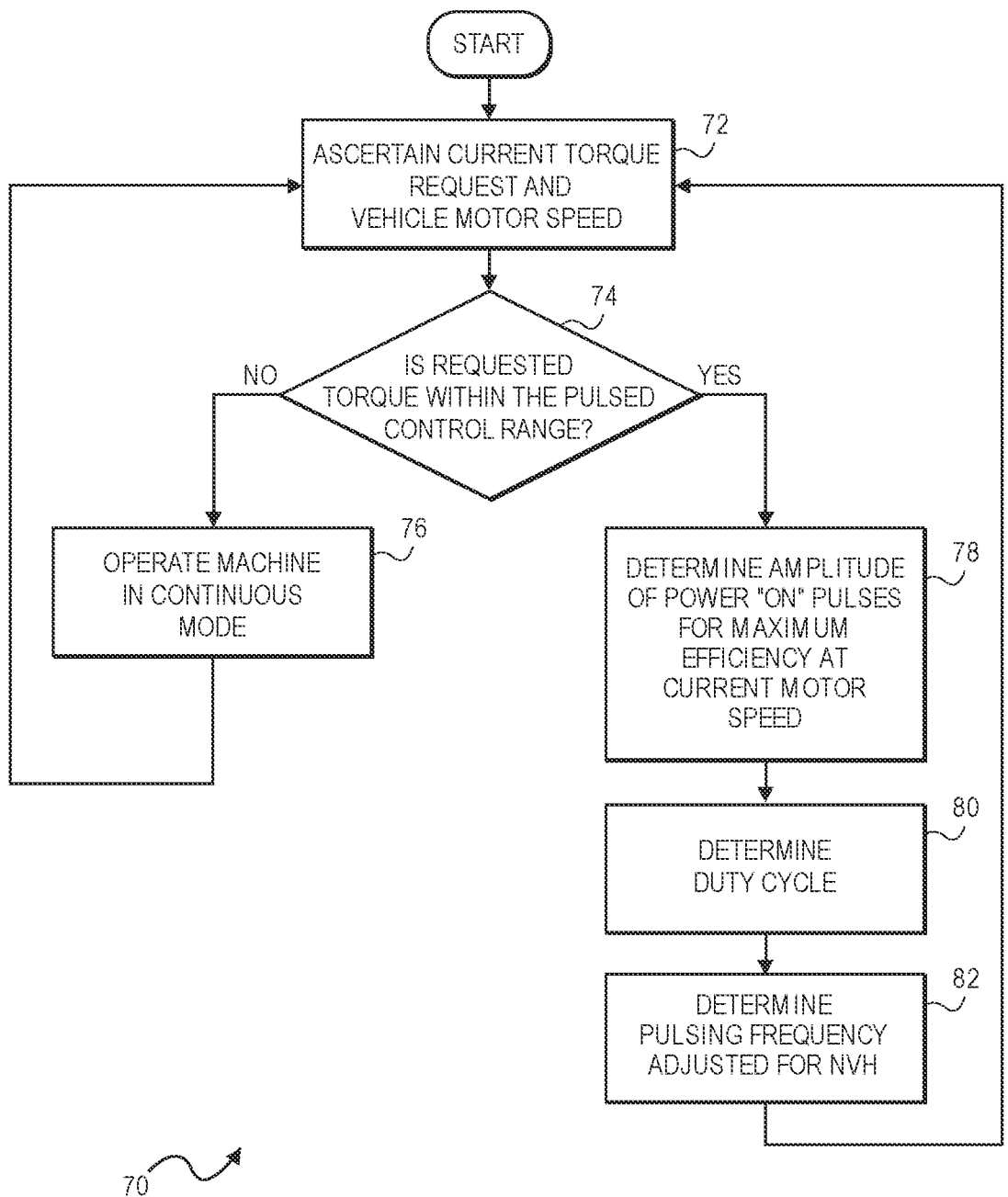
FIG. 6 is a flow diagram illustrating steps implemented by the motor controller in accordance with a non-exclusive embodiment of the invention.

Referring to FIG. 6, a flow diagram 70 illustrating steps implemented by the motor controller architecture 50 is illustrated.

In the initial step 72, the current torque request and machine speed are ascertained.

In decision step 74, a determination is made based on the ascertained current torque request and speed if the electric machine 56 should operate in the continuous mode or the pulsed mode. In other words, a determination is made if the desired torque demand is above or below the most efficient output torque for the current speed (i.e., the maximum efficiency curve 16 of the motor map illustrated in FIG. 1). If the desired torque is above the optimum torque, the machine is operated in the continuous mode rather than a pulsed mode. If below the most efficient output torque, then the electronic machine is operated in the pulse mode.

In step 76, the motor is operated in the continuous mode if the requested torque is above the most efficient output torque for the current machine speed.

In step 78, the amplitude of the pulses for maximum efficiency at the current machine speed is determined if the requested torque is below the most efficient output torque for the current machine speed.

In step 80, the duty cycle for operation in the pulsed mode is determined so that the average torque output of the on pulses matches the desired output.

In step 82, a pulsing frequency is ascertained by the pulse controller 58. As described above, the pulse controller ascertains the pulsing frequency by either accessing one or more tables 40 and/or relying on the computation module 62. As previously described, one or more of the inputs (a) through (i) may indicate that the pulsing frequency be adjusted upward so as to reduce NVH or revised downward if more NVH is acceptable or tolerable.

The above steps 72-82 are continuously performed while the electric machine 56 is in operation. At any particular machine speed and torque request, there will be a corresponding most efficient output torque. As the instantaneous torque request and/or current machine speed change, a decision is made to operate the motor in either the continuous or pulsed mode as appropriate. When the desired motor torque is below the most efficient output torque for the current machine speed, the overall efficiency of the motor is improved not only by pulsing the motor, but by adjusting the pulse frequency to take into account the inputs (a) through (i). As a result, for electric machine-powered vehicles, the overall efficiency of the vehicle is improved; meaning the vehicle range between battery recharging (or refueling with hybrids) is extended, while acceptable levels of NVH are achieved.

Competing Inputs

On occasion, two or more of the inputs (a) through (i) may suggest or indicate that the base pulsing frequency should be modified or adjusted in opposing directions. For example, switching from first gear to second gear allows the pulsing frequency to be reduced. However, if a user selectable NVH control requires a higher frequency for better NVH, then adjusting the pulsing frequency downward may not be feasible. On the other hand if the vehicle is unoccupied, then adjusting the pulsing frequency downward is not a problem. As these two examples illustrate, the pulse controller 58 preferably makes a final decision on pulsing frequency on a case-by-case basis after considering all the inputs (a) through (i) and a totality of the circumstances. It is noted that in the event of a conflict, the pulsing frequency is often adjusted so as to reduce NVH. It should be understood, however, that this is by no means a requirement. On the contrary for a given conflict, the pulsing frequency adjustment can result in an increase or decrease of NVH. Accordingly, the pulsing frequency for any two or more components or features are in conflict can be adjusted in accordance with any predetermined algorithm arranged to address the conflict.

Real-Time Feedback

Figure 7:
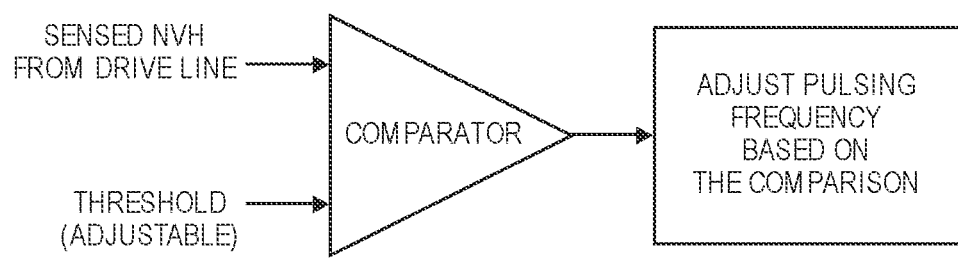
FIG. 7 is a diagram illustrating a real-time feedback for adjusting a pulsing frequency of an electronic machine in accordance with a non-exclusive embodiment of the invention.

Referring to FIG. 7, a diagram illustrating real-time feedback for adjusting the pulsing frequency in accordance with another embodiment is shown. In this embodiment, actual or sensed NVH is compared to a threshold. Based on the comparison, the pulsing frequency can be adjusted either upward or downward. With implementations of this embodiment, the actual NVH can be measured by one or more noise and/or vibration sensors located on the vehicle, such in the cabin of the vehicle or somewhere along the driveline of the vehicle. If the comparison indicates that the sensed NVH is below the threshold, then the pulsing frequency can be adjusted downward until the NVH increases and matches the threshold. On the other hand if the comparison indicates that the sensed NVH is above the threshold, then the pulsing frequency can be adjusted upward until the NVH increases and matches the threshold. It is further noted that in variations of this embodiment, the threshold can be adjustable as well. For example, if the vehicle has a NVH acceptable level controller, the threshold can be adjusted up or down depending on if the driver sets the level of NVH either high or low. The threshold can also be adjusted based on other inputs, such as eco mode, sport mode, luxury mode, etc.

Non-Exclusive Embodiments

In one embodiment, the present invention pertains to an electric machine controller for controlling the pulsing of an electric machine onboard a vehicle. In particular, the electric machine controller is arranged to, determine a torque demand for operating the machine as a motor, determine an amplitude for pulsed operation of the machine as the motor, determine a duty cycle for the pulsed operation of the machine as the motor, the amplitude and the duty cycle resulting in the generation of the determined torque demand, and ascertain a frequency for the pulsed operation of the machine as a motor while generating the determined torque demand, the frequency ascertained by taking into account Noise, Vibration and Harshness (NVH) either (a) caused by a measurable parameter of the vehicle or (b) a feature on the vehicle that adjust an amount of the NVH that is acceptable.

In another embodiment, the present invention pertains to a method of pulse controlling an electric machine used on a vehicle. The method involves pulsing the electric machine at a frequency that has been adjusted to take into account Noise, Vibration and Harshness (NVH) that is either caused by one or more components on the vehicle or that allows an adjustment of an amount of the NVH that is acceptable.

In yet another embodiment, the present invention pertains to an electric machine controller for controlling pulsing of an electric machine. The machine controller is configured to receive a signal indicative of a magnitude of Noise, Vibration and Harshness (NVH), compare the magnitude of NVH to a threshold; and adjust a pulsing frequency used to pulse the electric machine if the magnitude of the NVH exceeds the threshold, the pulsing frequency adjusted so that the magnitude of the NVH is reduced below the threshold.

Other Machine Types and Applications

It should be apparent from the foregoing description that the described pulsed machine control can be utilized in a wide variety of different applications to improve the energy conversion efficiency of a wide variety of different types of electric motors and generators. These include both AC and DC motors/generators. A few representative types of electric machines that may benefit from the described pulsing include both asynchronous and synchronous AC electric machines including Induction machines (IM), switched reluctance machines (SRM), Synchronous Reluctance machines (SynRM), Permanent Magnet Synchronous Reluctance machines (PMaSynRM), Hybrid PMaSynRMs; Externally Excited AC Synchronous machines (SyncAC) (also sometimes referred to by other names such Wound Field Synchronous machines (WFSM), Wound Rotor Synchronous machines (WRSM), or Electrically Excited Synchronous Machines (EESM)) Permanent Magnet Synchronous machines (PMSM), Eddy current machines, AC linear machines, AC and DC mechanically commutated machines, axial flux motors, etc. Representative DC electric machines include brushless, electrically excited, permanent magnet, series wound, shunt, brushed, compound and others.

Additional Embodiments

Although automotive applications have been used as an example of a vehicle propulsion application, it should be appreciated that the described control approach is equally beneficial in other propulsion related applications including: electric motors used in other types of vehicles including trucks, cars, carts, motorcycles, bicycles, drones and other flying devices; in robots and other devices that move autonomously within an environment; etc. As such, the term "vehicle" should be broadly construed to include all of the above and any other type of motorized moving assembly whether known now or developed in the future.

Motors used in appliances such as washing machines, dryers, heating, ventilation and air conditioning (HVAC) applications are another good examples of applications that can benefit from pulsed control. There are several components that contribute to pulsed motor control being a good fit for HVAC applications. These include the facts that: (a) the machines used in HVAC applications today are predominantly induction motors that don't contain permanent magnets; (b) a high percentage of the motors used in HVAC applications, including in particular variable speed HVAC condensers and/or air handlers, operate a substantial portion of the time operating regions below their high efficiency areas; and (c) the inertia of a fan or pump normally dominates the motor inertia, which tends to further mitigate potential NVH related impacts associated with pulsing.

Although only a few embodiments of the invention have been described in detail, it should be appreciated that the invention may be implemented in many other forms without departing from the spirit or scope of the invention. The various described pulse controllers and other control elements may be implemented, grouped, and configured in a wide variety of different architectures in different embodiments. For example, in some embodiments, the pulse controller may be incorporated into a motor controller or an inverter controller or it may be provided as a separate component. Similarly, for a generator, the pulse controller may be incorporated into a generator controller or a rectifier controller and in combined motor/generators the pulse controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

The pulse generator or machine controller may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

Generally, the schemes for pulsed motor control may be implemented digitally, algorithmically, using analog components or using hybrid approaches. The pulse generator and/or the motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In some implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive and the invention is not to be limited to the details given herein, but may be modified within the scope and equivalents of the appended claims.

What is claimed is:

1. An electric machine controller for controlling pulsing of an electric machine onboard a vehicle having a drivetrain that includes a multi-speed gearbox and the electric machine, the electric machine controller being configured to:
   determine a pulsing frequency for pulsed operation of the electric machine to deliver a desired torque, wherein the pulsing frequency is determined based at least in part on a current operational gear of the gearbox; and
   direct pulsed operation of the electric machine at the determined pulsing frequency to deliver the desired torque.

2. The electric machine controller of claim 1, wherein the gearbox is a transmission.

3. The electric machine controller of claim 2, wherein each gear of the gearbox is characterized by one or more different resonant frequency, and the pulsing frequency for each gear is selected to avoid the one or more resonant frequencies associated with such gear.

4. The electric machine controller of claim 1, wherein the gearbox has just two available gear ratios.

5. The electric machine controller as recited in claim 1 wherein a first pulsing frequency is used when the gearbox is in a first gear and a second pulsing frequency is used when the gearbox is in a second gear, the first and second pulsing frequencies being different.

6. The electric machine controller of claim 1, wherein the determined pulsing frequency is further at least partially based on a wheel-drive status of the vehicle.

7. The electric machine controller of claim 1, wherein the determined pulsing frequency is further at least partially based on a parameter and/or feature selected from the group including:

(a) a weight of a load carried by the vehicle;
(b) a selectable economy mode;
(c) a selectable sport mode:
(d) a selectable NVH controller that allows the driver to select different levels of acceptable NVH;
(e) occupancy;
(f) temperature;
(g) a first model that models NVH characteristics of the vehicle as the vehicle ages;
(n) a second model that models NVH characteristics of the vehicle following a cold start of the vehicle;
(i) an active noise control system;
(j) an active vibration control system;
(k) a road surface conditions; or
(l) any combination of (a) through (k).

8. The electric machine controller of claim 1, wherein the pulsing frequency is determined at least in part by using one of the following:
(a) a look up table;
(b) a multi-dimensional look up table;
(c) a sliding scale;
(d) a multiplier;
(e) a processor;
(f) a logic unit;
(g) a trained neural network; or
(e) any combination of (a) through (g).

9. The electric machine controller of claim 1, further configured to operate both as a motor and as a generator.

10. The electric machine controller of claim 1, further configured to operate the electric machine in a continuous mode when the desired torque is below a threshold and to operate the electric machine in a pulsed mode when the desired torque exceeds the threshold.

11. An electric machine controller for controlling pulsing of an electric machine onboard a vehicle having more than one available wheel drive state, the electric machine controller being configured to:
determine a pulsing frequency for pulsed operation of the electric machine to deliver a desired torque, wherein the pulsing frequency is determined based at least in part on a current wheel drive state of the vehicle; and
direct pulsed operation of the electric machine at the determined pulsing frequency to deliver the desired torque, wherein different pulsing frequencies are used for different wheel drive states.

12. The electric machine controller of claim 11 wherein the wheel-drive states of the vehicle includes a two wheel drive state and four wheel drive state and the pulsing frequency is adjusted based on whether the vehicle is in a two wheel drive state or a four wheel drive state.

13. The electric machine controller of claim 11 wherein the electric machine is a first electric machine that directly or indirectly drives at least a first wheel of the vehicle and the vehicle further includes a second electric machine that directly or indirectly drives at least a second wheel that is different than the first wheel and wherein the second electric machine is not used in a first wheel drive state and the second machine is used in a second wheel drive state.

14. The electric machine controller of claim 11 wherein the available wheel drive states include at least two of Front Wheel Drive (FWD), Rear Wheel Drive (RWD), Four Wheel Drive (4WD) and All Wheel Drive (AWD).

15. An electric machine controller for controlling pulsing of an electric machine onboard a vehicle having more than one available wheel drive state, the electric machine controller being configured to:
determine a pulsing frequency for pulsed operation of the electric machine to deliver a desired torque, wherein the pulsing frequency is determined based at least in part on a current wheel drive state of the vehicle; and
direct pulsed operation of the electric machine at the determined pulsing frequency to deliver the desired torque, and
wherein a first pulsing frequency is used when the vehicle is in a first wheel drive state, and a second pulsing frequency is used when the vehicle is in a second wheel drive state.

16. An electric machine controller for controlling pulsing of an electric machine onboard a vehicle having a drivetrain that includes the electric machine and a gearbox having an engaged state and a disengaged state, the electric machine controller being configured to:
determine a pulsing frequency for pulsed operation of the electric machine to deliver a desired torque, wherein the pulsing frequency is determined based at least in part on a current engagement state of the gearbox; and
direct pulsed operation of the electric machine at the determined pulsing frequency to deliver the desired torque.

* * * * *